United States Patent [19]

Lapeyre

[11] Patent Number: 4,993,543
[45] Date of Patent: Feb. 19, 1991

[54] LINK CHAIN BELT
[75] Inventor: James M. Lapeyre, New Orleans, La.
[73] Assignee: The Laitram Corporation, New Orleans, La.
[21] Appl. No.: 483,210
[22] Filed: Apr. 14, 1983

Related U.S. Application Data

[63] Continuation of Ser. No. 228,154, Jan. 23, 1981, abandoned, Continuation of Ser. No. 13,165, Feb. 21, 1979, abandoned, Continuation-in-part of Ser. No. 801,904, May 31, 1977, abandoned.

[51] Int. Cl.$^5$ .............................................. B65G 23/06
[52] U.S. Cl. .................................... 198/834; 198/853
[58] Field of Search ............... 198/834, 849, 851, 853; 474/154, 156, 164, 203, 206, 207

[56] References Cited

U.S. PATENT DOCUMENTS

| | | | |
|---|---|---|---|
| 298,761 | 5/1884 | Lind | 474/206 |
| 616,919 | 1/1899 | Haider | 474/156 |
| 1,151,587 | 8/1915 | Hess | 474/156 |
| 1,835,406 | 12/1931 | Kirsten | 474/156 |
| 1,930,466 | 10/1933 | Bowman | 474/156 |
| 1,937,304 | 11/1933 | Worrall | 198/851 |
| 3,174,617 | 3/1965 | Noffsinger | 198/851 |
| 3,602,364 | 8/1971 | Maglio et al. | 198/853 |
| 4,080,842 | 3/1978 | Lapeyre et al. | 198/853 |
| 4,213,527 | 7/1980 | Lapeyre et al. | 198/853 |

Primary Examiner—Joseph E. Valenza
Attorney, Agent, or Firm—Weingarten, Schurgin, Gagnebin & Hayes

[57] ABSTRACT

A chain belt formed of a plurality of pivotally connected preassembled parallel links. Each link includes a driving tooth protruding from one surface of the link midway between the pivotal axes of the link. The tooth is preferably formed so that its faces are a pair of intersecting, convex, cylindrical segments of like radii of curvature, the cylindrical axes of the segments being located such that the curvature of the faces insures that there if no scrubbing action where the belt is driven by a sprocket, the teeth of which are shaped to provide an inversely curved mating surface with the link teeth.

31 Claims, 6 Drawing Sheets

LINK CHAIN BELT

This application is a continuation of Ser. No. 228,154, filed 1/23/81 now abandoned; which was a continuation of Ser. No. 013,165 filed 2/21/79 now abandoned; which was a continuation-in-part of Ser. No. 801,904 filed 5/31/77 now abandoned.

This invention relates to articulated or linked belts, and particularly with a novel belt comprising modules each comprising a plurality of preassembled link-like elements.

It has long been known that endless belts, in the form of a loop, can be used particularly as a conveyor, for the transmission of power, and for the transmission of precise angular relationships, i.e. as a timing belt. The simplest form is a loop of flat, flexible material driven by frictional engagement, but such belts provide little, if any, intrinsic resistance to distortion under carrying load and tend to slip. Hence, their virtue is primarily in their cost, but they find little application for precision power transmission, timing or conveyance. For the latter applications, the preferred belt is a chain drive. Precision steel roller chains and inverted tooth or silent chains are considered primarily power transmission and/or power timing chains, particularly at average to high speed conditions.

The well known silent or "inverted" tooth driving chains are generally characterized in that each driving link is usually provided with a pair of teeth extending outwardly from the link from approximately the pivotal axes of the latter, parallel to one another and perpendicularly to the pitch line. While in theory these links have no sliding action in or out of the grooves of an associated sprocket wheel and are hence considered noiseless, in practice, the link teeth and sprocket teeth engage one another with a scuffing or rubbing contact, known as "scrubbing", with attendant wear on the teeth. Additionally, in a typical operation of a silent chain, the contact between the driving and driven faces of the chain teeth and sprocket teeth is substantially along a line or a narrow area of the tooth faces extending parallel to the rotational axis of the sprocket wheel. The driving pressure, being thus concentrated over this very small area, typically requires that the teeth surfaces be specially hardened to reduce wear.

Prior art silent chains also claim to reduce the detrimental effect of chordal action, i.e. the vibratory motion of the chain as it engages the sprocket wheel. This vibratory motion is manifest as a periodic acceleration and deceleration of the chain, and a rise and fall of the links of the latter with respect to its line of engagement with the sprocket wheel. Such chordal action, of course, is not present in a fully flexible belt such as a rubber timing belt, for the latter simply conforms at every point to the pitch circle of the sprocket wheel. However, for a chain formed of substantially rigid links which are pivotally joined to one another, flexible conformation to the pitch circle of the sprocket wheel is impossible. Roller chains and the like exhibit marked chordal action which limits high speed load carrying capability and makes transfer of the load from the chain to a stationary comb tangent to the sprocket wheel, particularly perilous for fragile items being carried by the chain. In order to reduce the chordal action of some current silent chains, the designers have provided ingenious pin and rocker joints and involute chain teeth and sprocket teeth. When such teeth engage one another, the contact point of the pin and rocker joint shifts upward and causes the pitch of the chain to elongate, reducing chordal action.

In U.S. Pat. No. 3,870,141 issued Mar. 11, 1975, there is disclosed a chain link belt particularly useful as a conveyor, capable of carrying heavy loads and transmitting substantial power at fairly high speeds. The chain belt therein disclosed is particularly advantageous in that, being modular, it is very easily assembled and repaired.

The modular belt of U.S. Pat. No. 3,870,141 is generally formed of a first plurality of link ends, each formed to circumscribe a pivotal hole and a second plurality of link ends, each also formed to circumscribe a pivotal hole, the pivotal holes in each plurality of link ends being respectively aligned along a common axis. The axes of the pivot holes of each plurality of link ends are parallel with one another. Each link end of the first plurality is joined to a corresponding link end of the second plurality through at least one cross-rib which lies between and substantially parallel to the axes of the two pluralities of pivotal holes. The link ends are dimensioned and spaced apart by a distance slightly greater than their respective widths. Thus, when the link ends of one module are nested or engaged with the link ends of another module by a common pivot pin extending through the pivotal holes in the respective link ends, the engagement of adjacent link ends tends to minimize the transmission of twisting shear to the pivot rod. Consequently, very advantageously the modules, chain belt and pivot pins of U.S. Pat. No. 3,870,141 can be formed of polymeric materials, thereby minimizing costs, providing high strength with light weight and avoiding lubrication problems. This chain belt can withstand severe extremes of processing temperatures, and highly corrosive environments such as are encountered frequently in laundries, food processing and other manufacturing processes.

To drive the chain belt of U.S. Pat. No. 3,870,141, there is usually provided a sprocket wheel with extending teeth arranged in staggered relation along the axis of rotation so that the teeth can engage a similarly staggered array of openings formed by adjacent engaged modules. These sprocket teeth bear against the portion of the link end which circumscribes the pivotal hole.

The present invention is directed toward a novel chain link having a driving tooth protruding therefrom intermediate pivot axes located at opposite ends of the link, the tooth having working surfaces of a unique configuration as hereinafter described. This novel chain link can be assembled to form a module for a chain belt generally of the type described in U.S. Pat. No. 3,870,141 but particularly adapted to provide very precise power transmission and/or timing requirements. To this end, the present invention is also typically embodied in a modularly structured chain belt in which each module is formed of a plurality of links each having a pair of link ends each formed to circumscribe respective pivotal holes, a number of links being arranged so that a first set of such holes in first plurality of such link ends are aligned along a common first linear axis, and a second set of such holes in a second plurality of such link ends are aligned along a second common linear axis, the first and second axes being parallel to one another. In the module formed of links of the present invention, each of the link ends of the first plurality is joined with the corresponding ones of link ends of the second plurality through an intermediate portion. In embodiments where the links are integrally joined to one another, the intermediate portion extend substantially parallel to the first and second axes. Appended to, and preferably formed integrally with each link is a single driving tooth which protrudes intermediate the first and second axes generally in a first direction perpendicular to a plane common to those axes. The tooth is preferably formed with its working surfaces as a like pair of plano-convex surfaces each being typically a substantially cylindrical segment of like radius of curvature, the respective cylindrical axis of each such segment being between the first and second axes through the pivotal holes. The term "working surface" is intended to refer to that surface of a tooth adapted to engage a driving element such as a sprocket or an element to be driven, as the case may be.

A particular object of the present invention is to provide a link of the type described which, in conjunction with a sprocket wheel of appropriate configuration, exhibits substantially no scrubbing action. Another object of the present invention is to provide a link of the type described, a plurality of which when formed into a hinged, endless belt used in conjunction with an appropriate sprocket wheel, exhibits remarkably small chordal action.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
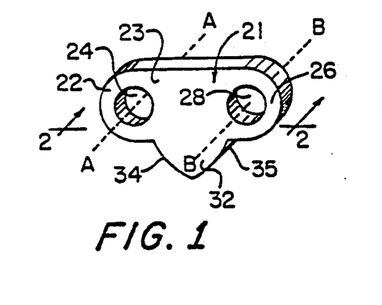
FIG. 1 is a perspective view of a typical link formed according to the principles of the present invention.
Figures 2, 3, 3A, 4, 9:
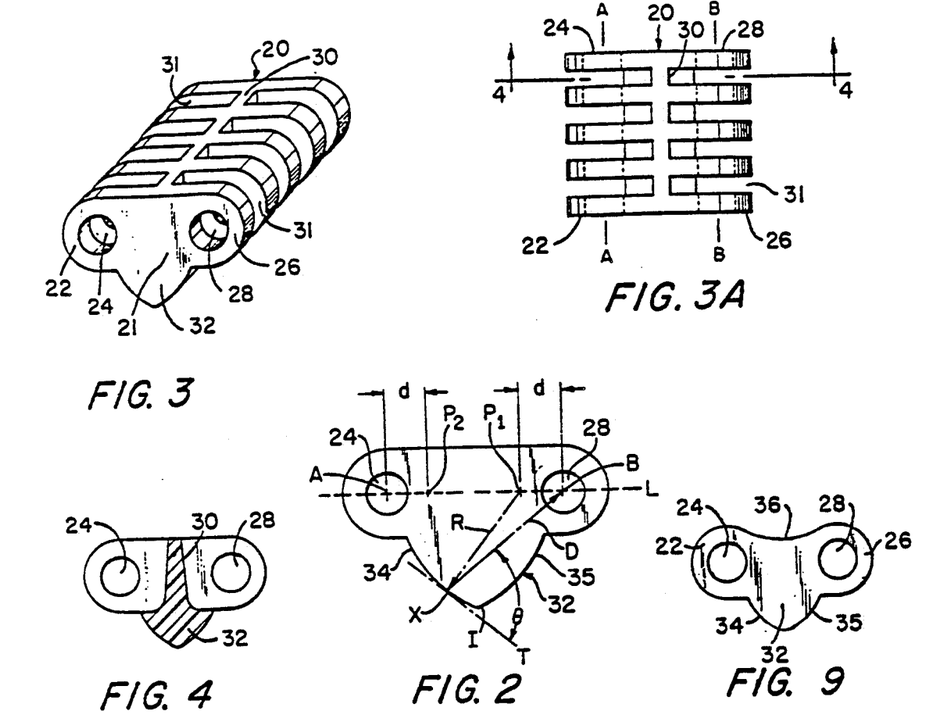
FIG. 2 is an enlarged view of a section taken along the line 2—2 of FIG. 1
FIG. 3 is a perspective view of a module formed of links of FIG. 1.
FIG. 3A is a top plan view of the module of FIG. 3.
FIG. 4 is a section taken along the line 4—4 of FIG. 3A.
FIG. 9 is an end view of yet another modification of a link formed according to the principles of the present invention.

In FIG. 1 there is shown a typical link of the present invention designated generally at reference numeral 21 formed as an elongated element having a pair of parallel side surfaces (only one of which is shown). A first link section or end 22 is formed to circumscribe a pivot hole 24 having a central pivotal axis A normal to the axis of elongation of link 21, the opposite link section or end 26 being similarly formed to circumscribe another pivotal hole 28 having a central pivotal axis B parallel to axis A. Appended to and preferably formed integrally with link 21 is included at least one driving tooth 32 which protrudes generally in a direction perpendicular to the common plane through the first and second pivotal axes A and B and intermediate, preferably midway, between the latter. The side surfaces of tooth 32 are, in this embodiment, coextensive with and coplanar with the corresponding side surfaces (such as surface 23) of link 21. As shown particularly in FIG. 2, the faces of tooth 32 are formed preferably of a pair of plano-convex, e.g. cylindrical surfaces 34 and 35 which intersect one another. Surfaces 34 and 35 are shown as substantially right-angled cylindrical segments having like radii of curvature, the cylindrical axes or axes of rotation $P_1$ and $P_2$ respectively of surfaces 34 and 35 being parallel to one another and disposed between and in a plane parallel to or coplanar with first and second pivotal axes A and B. For example, as shown in FIG. 2, surface 34 has a radius of curvature $R_1$, the origin or center of curvature lying at axis $P_1$, here shown disposed between and intersecting pitch line L through pivotal axes A and B of holes 24 and 28. Similarly, surface 35 has a radius of curvature which is centered as axis $P_2$ similarly intersecting line L and lies between the centers of pivotal axes A and B of holes 24 and 28. It will be seen therefore that the intersection of surfaces 34 and 35 lies along a line I (shown as a point) parallel to and equidistant from the first and second axes A and B, so that tooth 32 is preferably bilaterally symmetrical about line I.

The configuration of surfaces 34 and 35 of tooth 32 shown in FIG. 2 are not only plano-convex, but the locations of the axes of curvature thereof are of great importance. Specifically, axis $P_2$ is at some distance d from axis A and axis $P_1$ is the same distance from axis B, i.e. they are equidistant from the nearest respective pivotal axis. Axes $P_1$ and $P_2$ are in a common plane parallel to or coplanar with the common plane of axes A and B. For any point X on surface 34, there is a tangent T which, of course, is a perpendicular to $R_1$ the radius of curvature of surface 34 to point X. The location of axis $P_1$ must then be such that an angle $\theta$ between tangent T and line D, which extends from point X perpendicularly to the pivotal axis (here axis B) nearest to axis $P_1$, is not more than 90° when observed looking into the convex surface of the opposite face (here surface 35). Because as noted, the tooth is bilaterally symmetrical, this constraint applies also to the location of axis $P_2$ with respect to axis A and any point on surface 35. If angle $\theta$, hereinafter in this specification and claims referred to as the tangent angle, is 90° or less for each tooth surface, then as discussed hereinafter, the tooth will seat in a corresponding groove of a sprocket wheel without scrubbing. Not only does the structure of tooth 32 provide a non-scrub action, but when used with appropriate sprocket wheels, typically a minimum of twelve or more grooves matched to tooth 32, chordal action is reduced very substantially over prior roller chain structures formed of links 21, as will be described hereinafter.

Reference is now made to FIGS. 3 and 3A inclusive wherein there is illustrated one embodiment of a chain link module incorporating the principles of the present invention. This module, generally designated at 20, is designed to be formed as an integral unit typically, but not necessarily of polymeric material by any of a number of conventional molding processes. The polymer used is preferably a glass-reinforced polypropylene, but many other materials can be used as well. Module 20 comprises a multiplicity of elongated, parallel, spaced-apart, links 21 which for the sake of convenience in illustration and exposition, are shown to be five in number, although it is to be understood that the module can and frequently does, comprise a substantially greater or lesser number of such links 21. All of links 21 have substantially the same length and width, and thus the length dimension of module 20 is determined by the length of the individual links while the width of module 20 is determined by the number of links, their width and the spacing therebetween. In the embodiment shown in FIGS. 3 and 3A, all of links 21 are preferably rigidly joined together and held in substantially parallel relation by an integrally formed intermediate section 30, thus forming a rigid, open or slotted structure in which the parallel link ends alternate with slots 31. Alternatively, module 20 can be formed of a plurality of links 21 and requisite spacers to provide slots 31, all held together mechanically as by adhesive or the like. The length of each slot is at least equal to twice the distance between the center of a hole such as 24 and the distal extremity of associated link 22, thereby providing sufficient space into which a corresponding link end of another like module can fit so that the respective holes in the fitted link ends are registered with coaxial pivot holes. Link ends 22 and 26 are held spaced apart by adjacent surfaces by a distance just slightly greater (e.g. 0.003 inches or less) than the width of the link ends so that the link ends of each module may fit snugly but movably between the link ends of an adjacent module with parallel facing surfaces in contact with one another.

Thus, as shown particularly in FIG. 3A, the module includes a first plurality of pivot holes 24 which are all aligned coaxially along first linear pivotal axis "A" and a second plurality of pivotal holes 28 which are similarly coaxially aligned along second linear pivotal axis "B", the first and second linear axes A and B being parallel to one another. The respective pluralities of aligned pivot holes are intended to receive pivot rods or pins which are adapted to pivotally connect module 20 with like modules end-to-end while laterally aligning the adjacent modules. In the embodiment shown wherein module 20 is formed of integrally molded together links 21 and intermediate section 30, the face width of each tooth 32 is selected so as to form an integral unit tooth which extends across the entire width of module 20, i.e. from one end element 21 to the other end element 21. This form of tooth 32 lends itself to ready molding in the formation of the modules and provides a large and stable driving surface, as will be described later herein. However, unit tooth 32 can be molded to be of somewhat different width than the width of module 20 between end elements 21 and can be formed, instead, simply as a plurality of individual, arranged teeth 32 corresponding to the respective links.

Figure 10:
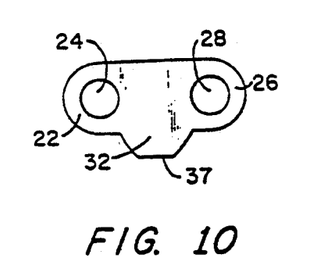
FIG. 10 is an end view of yet another modification of a link formed according to the principles of the present invention.
Figure 15:
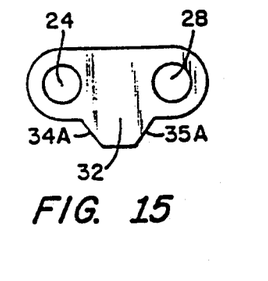
FIG. 15 is an end view of yet another modification of a link of the present invention.

The modules, subject to the above-described constraints on the geometry of the working surfaces of tooth 32, may take a number of slightly different configurations. Some examples of alternative configurations are shown in FIGS. 9, 10 and 15 wherein respectively the module of FIG. 9 includes a dished portion or concavity 36 in the portion thereof opposite tooth 32, concavity 36 being in the form of a trough having its long axis substantially parallel to linear axes A and B through holes 24 and 28. A linked belt formed of the modules of FIG. 9 would have a corrugated upper surface with the corrugations extending in a direction substantially perpendicular to the direction of belt travel, and for example, would provide either a high speed drainage surface for some articles to be conveyed thereon or a surface capable of engaging and carrying various articles of appropriate size. It will be seen that tooth 32 of the module of FIG. 9 is formed of a pair of surfaces 34 and 35 in substantially the same manner as the tooth shown in FIGS. 1, 3 and 4. However, it will also be seen that the apex of tooth 32 in FIG. 9 however has been provided with a separate radius of curvature so as to blunt the apex somewhat.

Alternatively, as shown in FIG. 10, faces 34 and 35 are cylindrical segments and the surface of the module opposite tooth 32 is maintained as a substantially flat surface (at least along the link-like elements 21). However, the apex of tooth 32 has been truncated as at 37 so as to provide a relief space with regard to a sprocket groove, or so that the teeth of the sprocket can be shortened if desired.

In a modification of the module of FIG. 10 shown in FIG. 15, tooth 32 is faced with substantially flat surfaces 34A and 35A which can be chords or part of chords of the cylindrical segments constituting faces 34 and 35 of the device of FIG. 10. Surfaces 34A and 35A need not be flat but can assume a curvature lying between the cylindrical curvature of faces 34 and 35 of FIG. 10 and a plane forming a chord to that cylindrical curvature so long as the tangent angle is not more than 90° as noted.

Figure 5:
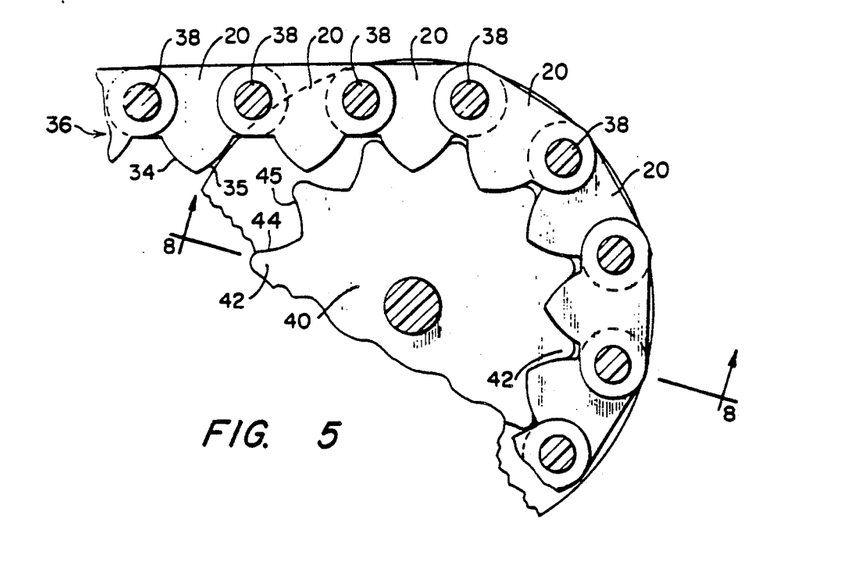
FIG. 5 is a side view of a portion of a linked belt formed of the modules of FIG. 3, in engagement with a driving sprocket wheel, shown only in fragment.

A plurality of modules 20 are assembled in end-to-end (and if desired side-to-side) relation to form belt 36 (shown in fragment) when connected by pivot rods 38 as shown in FIG. 5. Holes 24 of one module and holes 28 of the next module are joined by pivot rod 38 to create a pin-and-bushing type of joint. It will be appreciated that intermediate section 30 as reinforced by its connection with tooth 32 functions to support elements 21 against lateral forces tending to separate the links as well as on twisting or bending forces on the modules which would tend to shear pivot pins 38. To drive belt 36 formed by linking a plurality of modules 20 together with pins 38, there is provided a simple sprocket wheel 40 shown only in fragment, sprocket wheel having a plurality of radial teeth 42. Each groove defined by surfaces 44 and 45 lying between adjacent teeth 42 are shaped to mate, at least in major part, with the corresponding surfaces 34 and 35 of teeth 32, i.e. surfaces 44 and 45 are cylindrical segments which are the inverse of surfaces 34 and 35 respectively, in that the former surfaces are concave where the latter surfaces are convex. It will be appreciated that when a pair of modules 20 are coupled to one another by pivot pin 38 because the modules are staggered the width of the combined modules is greater than the width of a single module by at least a width of one link-like element 21. The axial width of the driving teeth 42 on sprocket wheel 40 should therefore preferably have a width at least equal to or greater than the width of the coupled modules.

As noted earlier, the curves employed in shaping tooth 32 and the matching sprocket serve to insure that the tooth faces cannot rub or abrade the sprocket surface during entry to exit, i.e. obviates scrubbing action, thereby minimizing wear and permitting high speed operation.

Figure 13A:
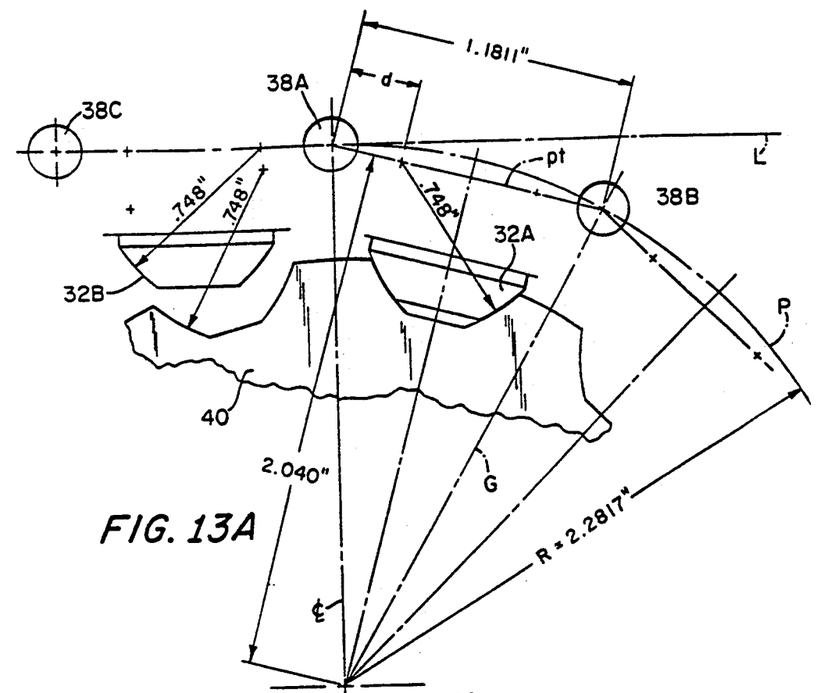
FIG. 13A is a diagram showing the relation of the teeth of links of the present invention to a sprocket wheel formed according to the present invention.

This can be demonstrated by a numerical analysis of the relationship between the position of arc centers for tooth profile relative to link pivot points, and the scrubbing action of belt links on the driving sprocket. Assume for example that conveyor belt 36 approaches the driving sprocket wheel 40 and is supported upon carrying ways so that the centers of the pivot rods 38 connecting the individual conveyor belt links 20 approach wheel 40 on a horizontal line. When any pivot rod center reaches the vertical center line of the driving sprocket, it is fully supported by the sprocket. Referring particularly to FIG. 13A (in which only teeth 32 are shown as part of a link, and teeth 32 are in truncated form as in FIG. 15) it can be seen that pivot rod 38A is on the vertical center line CL so that tooth 32A is fully seated in an appropriate groove on sprocket wheel 40, while tooth 32B is approaching wheel 40 and quite separate from the latter. As the center of pivot rod 38A is carried around the sprocket wheel, it follows a circular path P. Therefore, the center of any pivot rod approaches the driving sprocket on a straight horizontal line L to the sprocket vertical center line CL, then follows a circular path P at the pitch radius R around the sprocket wheel.

The vertical height of the center of pivot rod 38A above the sprocket center is equal to the pitch radius R. Radius R is determined by the conveyor belt pitch pt of 1.1811 inches (30 mm) and the number of teeth in the sprocket. For a 12-tooth sprocket, pitch radius R is $(1.1811/2)/\sin 15° = 2.2817$ inches. This distance R is 1.93185 times the pitch. Conversely, the pitch is 0.5176R for a 12-tooth sprocket. The radius to the profile of the conveyor belt link was chosen as 0.748 inches.

The distance from the sprocket center to the line pt between centers 38A and 38B in FIG. 13A is $2.2817 \cos 15° = 2.2040$ inches. With these factors known, it is possible to calculate the position of a pivot rod center for any sprocket position or any point along a straight line connecting the pivot rod centers of a conveyor belt link. The reason for wanting to locate the position of these points is that the centers of the arcs which define the profiles of conveyor belt link which engage the sprocket lie along this line. For exemplary purposes, the centers for the arcs which define the belt tooth faces or profiles have been selected at a distance d which is one-quarter of a pitch in from the pivot rod centers or pivot points, so that the tangent angle as noted is less than 90°.

Figure 13B:
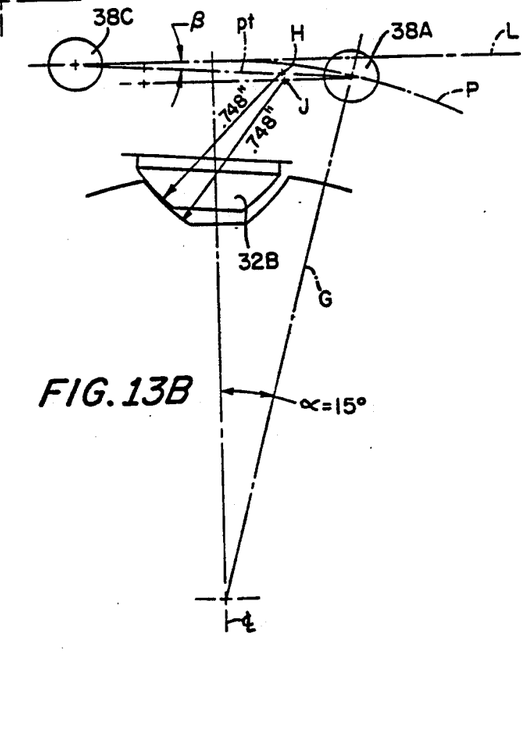
FIG. 13B is a simplified version of the diagram of FIG. 13A showing the displacement of a link tooth and sprocket wheel through an angle of 15° relative to the sprocket center line.

Next, consider the position shown in FIG. 13B, where the pivot point 38A has advanced 15° with respect to FIG. 13A beyond the vertical center line. The belt link center line pt connecting the pivot points made an angle $\beta$ with the horizontal line L. The sine of the angle $\beta$ is $1.93185(1-\cos \alpha)$, where $\alpha$ is the angle the line G connecting pivot point 38A and the sprocket center makes with the vertical center line CL. For $\alpha = 15°$, $\beta = \arcsin 1.93185(1-\cos 15°) = 3.774°$. At a distance of one-quarter the pitch left of pivot point 38A, i.e. at point H, the vertical distance below horizontal line L is $0.75(1.1811) \sin 3.774° = 0.0583$ inches. Point H is the center of the radius to the tooth face or profile. The vertical distance to point J, the center of the radius to the sprocket tooth face, from horizontal line L is $2.2817 - 2.2040$ or 0.0777 inches. This is 0.0194 inches below point H as as shown, tooth 32B will not rub on the sprocket.

Figure 13C:
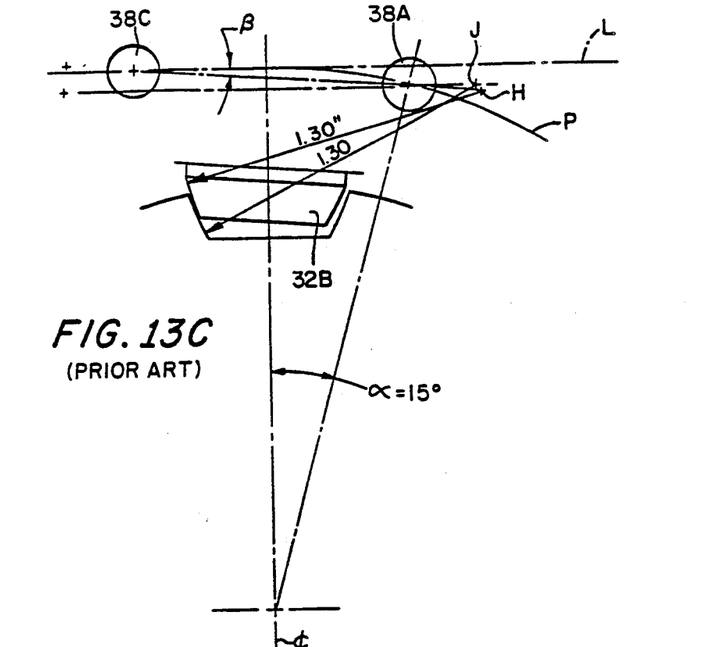
FIG. 13C is a diagram similar to FIG. 13A but in which the link tooth surfaces are not formed within the teachings of the present invention.

Next, consider the position shown in FIG. 13C, again with the angle $\alpha$ equal to 15°. This time, the centers of curvature for the faces of tooth 32B are shown located one-quarter pitch outside the pivot points so that the tangent angle is greater than 90°. Again, $\beta$ is 3.774° since $\alpha$ is still 15°. Point H is $1.25(1.1811) \sin 3.774° = 0.0972$ inches below the horizontal line. Point J is 2.2040 inches above the sprocket center or 0.0777 inches below the horizontal line. Therefore, point J is 0.0195 inches above point H. For this case, the link tooth face would be theoretically below the sprocket tooth face. Since this cannot happen practically, the link tooth face will rub on the sprocket tooth face it drops into its seat (while the sprocket rotates 30°), and pivot point 38C will be lifted above horizontal line L.

Figure 13D:
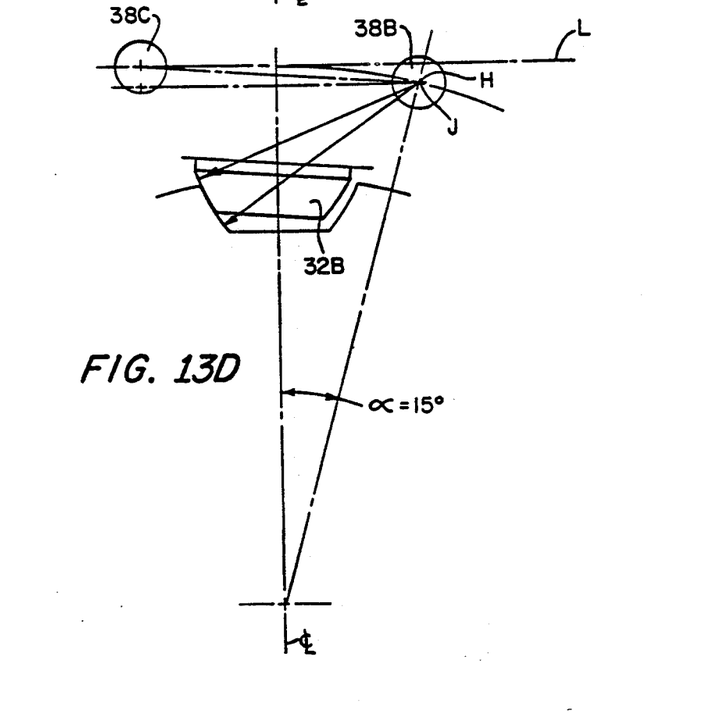
FIG. 13D is a diagram similar to FIG. 13A but in which the centers of curvature of the tooth faces are coincident with the pivotal axes of the link.

As a fourth and final case, consider the position shown in FIG. 13D. Again, the angle $\alpha$ is chosen as 15°, but this time the centers for the belt link tooth faces are selected in the unique positions of exactly at the pivot points, and the tangent angle equals 90°. The distance of point H would be $1.000(1.1811) \sin 3.774° = 0.0777$ inches below the horizontal line. Point J would be $2.2817 - 2.2040$ or 0.0777 inches below the horizontal line. Therefore, point J and H would be coincidental, and the link tooth face and the sprocket tooth face would be coincidental. Theoretically, they would be in contact as the belt link dropped into its sprocket seat, but with no rubbing pressure between the two.

As earlier noted, only the pivot points of the belt lie on the pitch circle as they travel around the sprocket wheel, and lines connecting the pivot points fall below the pitch circle. The links approaching the driving sprocket, therefore, have a variable velocity characteristic of the chordal effect. The belt made with links as hereinbefore described can be analyzed for chordal effect by determining the distance traveled by a pivot point as it approaches the driving sprocket for a small angle of sprocket rotation.

Figure 16:
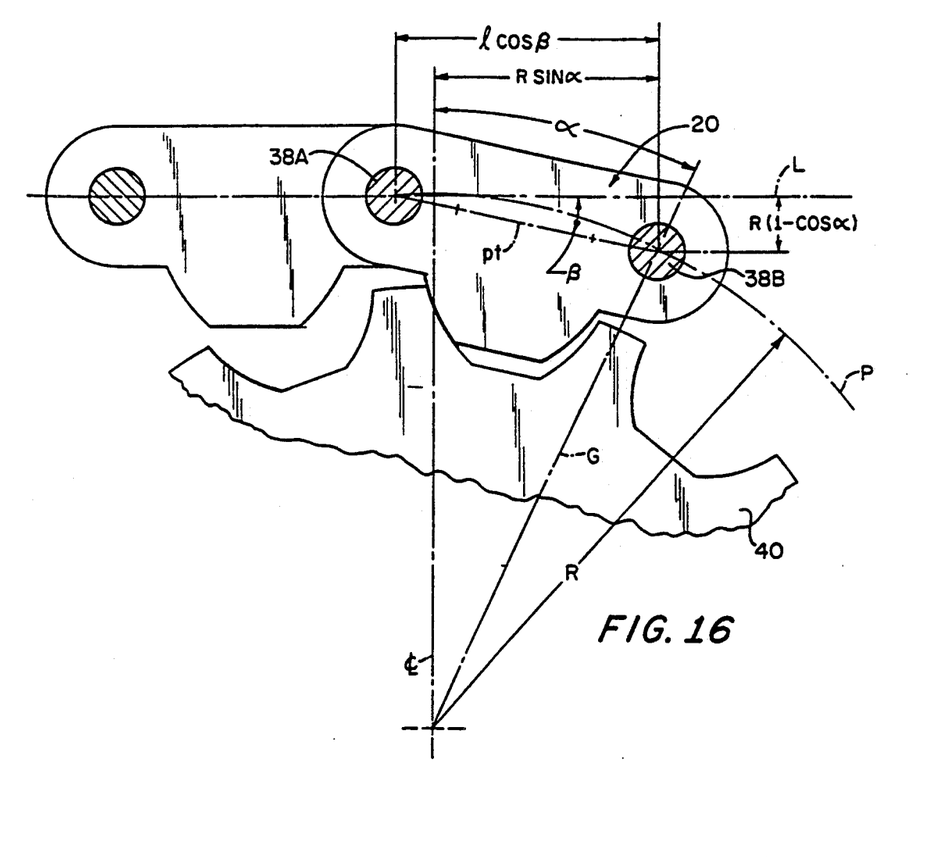
FIG. 16 is a diagram according to the present invention useful in analyzing the chordal action of the belt and sprocket wheel of the present invention.

A twelve-tooth sprocket with a conveyor belt pitch of 1.1811 inches (30 mm) will be assumed for this analysis as shown in FIG. 16 because, as well known, sprockets with more teeth will exhibit less chordal action proportionately. The pitch radius R is again assumed to be $(1.1811/2)/\sin 15° = 2.2817$ inches, i.e. 1.93185 times the pitch. The angle $\beta$ is the angle between an extension of the horizontal line L upon which the pivot points approach and a line pt connecting pivot points 38A and 38B. The sine of this angle is $1.93185 (1 - \cos \alpha)$ where $\alpha$ is the angle line G through the sprocket center and pivot point 38B makes with the sprocket vertical center line CL. The horizontal distance from the vertical center line CL to the pivot point 38B is $R \sin \alpha$. The horizontal distance between pivot points 38B and 38A is $\lambda \cos \beta$. Therefore, pivot point 38A is shown at $\lambda \cos \beta - R \sin \alpha$ to the left of the sprocket vertical center line CL.

Figure 17:
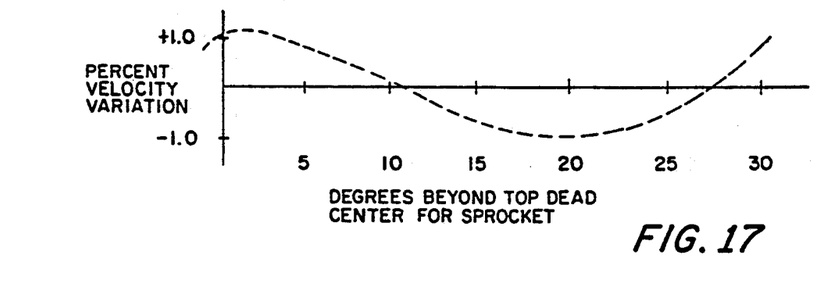
FIG. 17 is a graph showing the chordal variations in velocity using a twelve tooth sprocket wheel in the present invention.

To determine the velocity variation, the distance from pivot point 38A to the sprocket vertical center line was calculated for every two degrees of sprocket rotation and a plot of the velocity variation for about 30° of driving sprocket rotation is shown in FIG. 17.

With this analysis in hand, it is seen that the conveyor belt action and velocity variation are considerably different from that of a roller chain running on a sprocket with the same number of teeth. For example, a similarly dimensioned roller chain would rise and fall approaching a twelve-tooth sprocket, and the velocity variation from chordal action would be about 7.2 percent. The present invention exhibits an improvement of about 700% over such a chain.

Figure 6:
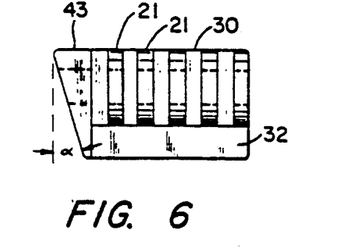
FIG. 6 is a front elevation view of a modification of the module of FIG. 3, particularly adapted for use with a V-sheave sprocket drive.
Figure 7:
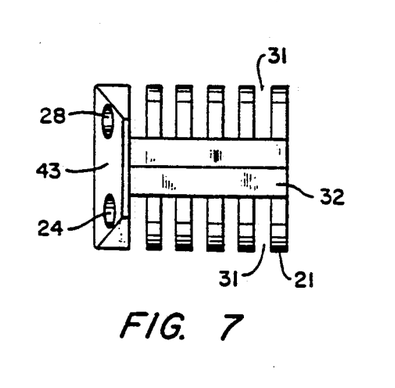
FIG. 7 is a front elevation of the mirror form of the module of FIG. 6.
Figure 8:
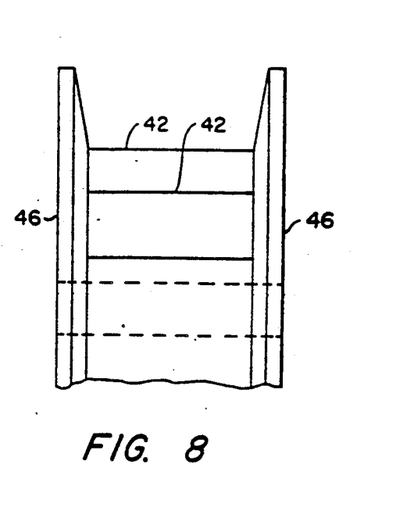
FIG. 8 is a fragmentary showing of a V-sheave sprocket drive only taken along the line 8—8 of FIG. 5.

In one particularly desireable form of the present invention as shown in FIGS. 6 and 7, module 20 is formed with at least one edge or end element 21 designated as edge guide 43 having a width which is smaller at or near tooth 32 (the bottom portion as shown) than at the top (as shown) so that the edge of end link or element 21 is tapered or beveled through an angle $\alpha$ as shown in FIG. 6. A belt can then be formed of modules such as is shown in FIG. 6, by providing that each alternative module is simply a reversed form of the module of FIG. 6 so that edge guide 43 alternates from left to right along the belt. When this belt is assembled by joining the alternately reversed modules with pivot pins 38, the cross section of the belt will have a V-shaped configuration, thus providing a link belt which also then possess attributes of V-belts. To drive such a link belt with a V-shaped configuration, sprocket wheel 40 of FIG. 5 can have the configuration of a pitched chain sheave such as is shown in FIG. 8 where the central hub or sprocket with teeth 42 is disposed between a pair of circular flanges shaped as shallow conical discs 44. The conical angle of discs 44 should be matched to the taper angle, $\alpha$, of the module shown in FIG. 6 to gain the advantages of V-belts.

Figures 14, 18, 18A, 19:
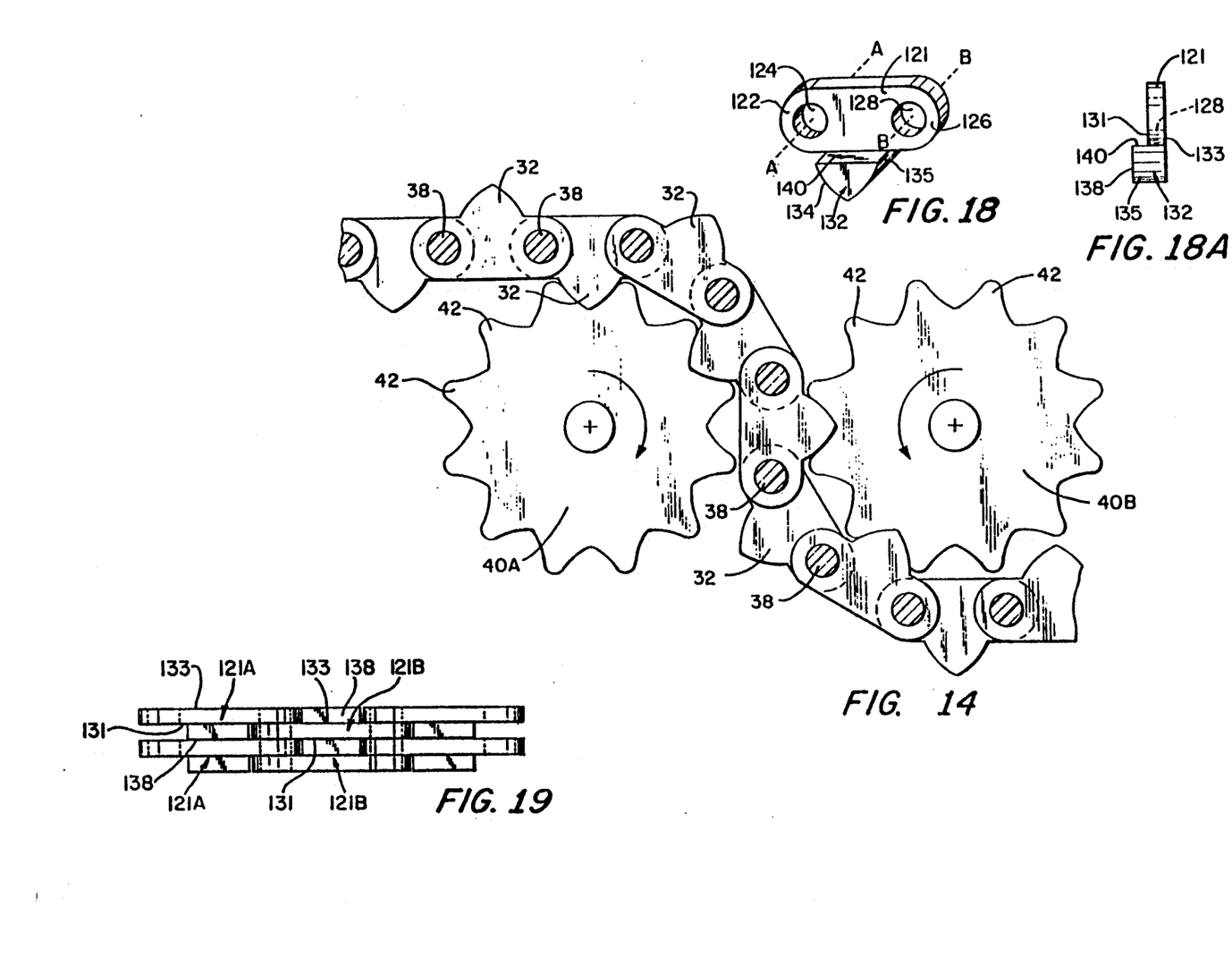
FIG. 14 is a side view of a portion of a belt formed from the modules of FIG. 3 arranged to serpentine through a pair of counter-rotating driving sprockets.
FIG. 18 is a perspective view of another form of link embodying the priciples of the present invention.
FIG. 18A is an end view of the link of FIG. 18.
FIG. 19 is a top plan view of a fragment link belt formed of links of FIG. 18.

The links of the present invention, such as are shown in FIG. 1 can also be assembled to form a belt in which only every other (or third, fourth, etc.) pivotally coupled link (or module as the case may be) bears a tooth 32 particularly when the links or modules are very small. Further, one can assemble a belt in which teeth 32 do not necessarily all protrude in the same direction radially either inwardly or outwardly with respect to the endless loop formed by the belt. For example, as shown in FIG. 14, the links or modules formed therefrom may be assembled so that teeth 32 protrude radially (with respect to the loop formed by the belt) in alternately opposite directions. When used with a pair of counter-rotating driving sprockets 40A and 40B (similar to sprocket 40 of FIG. 5) the belt of FIG. 11 can be driven along a tortuous or serpentine path with substantially no slippage or power loss and therefore provides a very precise timing belt. Alternatively, one can employ a double-tooth link such as is shown in FIG. 12 which includes a second tooth 32A extending on the opposite side of the module from tooth 32 and formed of two cylindrical surfaces centered on axes denoted as $P_2$ and $P_1$ or even other points.

Figure 11:
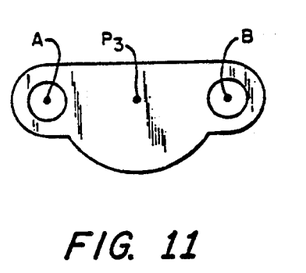
FIG. 11 is an end view of an extreme form of a link formed according to the principles of the present invention.
Figure 12:
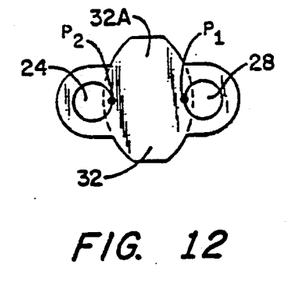
FIG. 12 is an end view of a double-toothed version of a link formed according to the principles of the present invention.

As shown in FIG. 11, when the pitch of a link (i.e. the distance between axes A and B) is sufficiently large in relation to the thickness or height of the link, one can generate both surfaces 34 and 35 about a single axis shown as point $P_3$ lying equidistant between axes A and B. It will be apparent that the closer to the midpoint between A and B one places the axes of revolution of surfaces 34 and 35, the shallower will become tooth 32 (the extreme case being the circular segment shown as tooth 32 in FIG. 11), but the tooth separation (i.e. the spacing between tooth and sprocket surfaces per angular degree of movement of the link about either pivotal axis A or B) is maximized.

Another variation of the link of the present invention is shown in FIGS. 18 and 18A, wherein the link is formed, much as in FIG. 1, as an elongated element 121 having a first link end 122 formed to circumscribe a pivot hole 124 having a central pivotal axis A normal to the axis of elongation of the link, the opposite link end 126 being similarly formed to circumscribe another pivotal hole 128 about pivotal axis B parallel to axis A. Appended to link 21 and extending therefrom in a direction perependicular to the common plane of axis A and B and intermediate the latter is driving tooth 132. The latter has a first side parallel to, coextensive with and coplanar with side surface 133 of link 121 (i.e. surface 133 being perpendicular to both axes A and B) as shown particularly in FIG. 18A, in the same manner as in the embodiment of FIG. 1, each side surface of the tooth 32 being coplanar with the corresponding parallel side surface of the link. In the link of FIG. 18 and 18A, tooth 132 however is slightly more than twice as wide as the width of the other portion of the link (i.e. the distance between side surface 133 and opposite side surface 131) so that, in effect tooth 132 includes a portion 138 which extends outwardly from surface 136. Working surfaces 134 and 135 of link 121 (corresponding to working surfaces 34 and 35 of link 21 in FIG. 1) are formed exactly as heretofore described in connection with link 21 of FIG. 1.

Although portion 138 is shown as a solid protrusion bounded by working surfaces 134 and 135 and having a flat top or upper surface 140 lying in a plane parallel to but displaced from the common plane of axes A and B, it will be appreciated that if one wishes to conserve material and reduce link weight, portion 138 can be formed as a hollow protrusion. Typically, in this latter case, portion 138 would be bounded by surfaces 134 and 135, but upper surface 140 would be concave toward the tooth apex or even molded with inner walls approximately paralleling working surfaces 134 and 135.

As will be seen from the fragment shown of the belt of FIG. 19, links such as link 121 A formed of one "handedness" (for example, with portion 138 extending out from surface 131 as described) can be formed into a side-by-side module and combined with a module made of side-by-side links of opposite "handedness" (i.e. links such as 121B wherein portion 138 extends from surface 133 instead) to provide a belt in which no edge discontinuities or gaps are formed as would be the case using modules such as those of FIG. 3A. In effect, the design of tooth 132 as being slightly more than twice the width of the upper portion of the link, provides an automatic spacer between side-by-side assembled links.

Since certain changes may be made in the above apparatus without departing from the scope of the invention wherein involved, it is intended that all matter contained in the above description or shown in the accompanying drawing shall be interpreted in an illustrative and not in a limiting sense.

What is claimed is:

1. A linked belt and sprocket assembly comprising: a plurality of identical linked modules, each having a plurality of links of the same length and width and sufficiently rigid to resist bending in the plane of an associated sprocket wheel, each module having a first plurality of link ends of substantially identical width, and a second plurality of link ends of substantially identical width, each link end circumscribing a pivotal hole, said holes of said first plurality being arranged coaxially along a first pivotal axis, said holes of said second plurality being arranged coaxially along a second pivotal axis parallel to said first axis;

said link ends having no driving engagement with an associated sprocket wheel;

each of said modules having at least one driving tooth integral with and protruding therefrom substantially normal to the pitch line between said pivotal axes and intermediate the latter;

said tooth having a pair of working surfaces, each of the working surfaces having a shape in the range between and including that of a cylindrical segment and a chord of said segment;

the axis of each working surface being parallel with the pivotal axes of the link and positioned intermediate the pivotal axes or coincident with the pivotal axis furthest from that surface;

the pair of working surfaces being part of a pair of intersecting loci;

the shape of each of the working surfaces being such that the tangent angle of each such surface is not more than 90°;

one of said pluralities of link ends of each said module being engaged between one of said pluralities of link ends of an adjacent module except for the individual link ends positioned at the extreme sides of said belt;

means extending through said holes pivotally connecting said modules at engaged link ends;

a toothed sprocket wheel having recesses between adjacent teeth thereof, each of said recesses including a pair of facing surfaces of shape corresponding to the pair of working surfaces of said driving tooth; and only the teeth of said connected links being in driving engagement with the recesses of said sprocket wheel, the engaged linked belt and sprocket wheel exhibiting minimal scrubbing action and chordal action.

2. A linked belt assembly as defined in claim 1 wherein said working surfaces are like surfaces with substantially identical radii of curvature.

3. A linked belt assembly as defined in claim 1 wherein said tooth is blunted, adjacent said line of intersection, by a surface formed as a cylindrical segment having its axis on said line.

4. A linked belt assembly as defined in claim 1 wherein said tooth is truncated adjacent said line of intersection.

5. A linked belt assembly as defined in claim 1 wherein the radii of curvature of said surfaces are centered at a common cylindrical axis.

6. A linked belt assembly as defined in claim 1 wherein said link ends and tooth are of the same width.

7. A linked belt assembly as defined in claim 1 wherein said working surfaces and facing surfaces are cylindrical segments of substantially like radius of curvature.

8. A linked belt assembly as defined in claim 7 wherein the axes of said cylindrical segments lies substantially in plane common to said first and second axes.

9. A linked belt assembly as defined in claim 1 wherein said working surfaces are curved and said facing surfaces are curved and inverse to the curved working surfaces.

10. A linked belt and sprocket assembly as defined in claim 1 wherein each of the modules includes:

a tapered side which tapers toward the driving tooth such that in cross-section the module is smaller near the driving tooth, the taper having an angular configuration to mate with a corresponding V-shaped wheel;

said modules being pivotally connected at engaged link ends, the tapered side of each module being opposite to the tapered side of adjacent modules to provide an average cross-section of said belt having a V-shaped configuration to mate with a corresponding V-shaped wheel.

11. A linked belt and sprocket assembly as defined in claim 10 wherein the sprocket wheel includes a pair of circular flanges having confronting tapers conforming to the V-shaped cross-section of the pivotally connected modules.

12. A linked belt and sprocket assembly comprising:

a plurality of identical linked modules interconnected in end-to-end relation to form a belt, each module including:

a plurality of link members of identical shape;

each member having a flattened elliptical portion with first and second ends and a tooth portion projecting outward from said elliptical portion;

said ends each having first and second pivot holes therethrough and defining first and second pivot axes axially through said pivot holes;

said first and second pivot axes defining a pitch plane and said tooth of each link member being symmetrically disposed about a plane orthogonal to the pitch plane and parallel to and bisecting the pitch axes;

means extending through respective first and second pivot holes of adjacent modules to secure adjacent modules one to the other and to provide for pivotable rotation of adjacent link modules;

said projecting tooth of each module having first and second working surfaces each symmetrically disposed on a respective side of said orthogonal plane and which intersect at a line parallel to the pivot axes in said orthogonal plane;

each working surface having a shape in the range between a cylindrical segment and a chord of a cylindrical segment having a center located at the farthest pivot axis or between that axis and the orthogonal plane;

a toothed sprocket wheel having recesses between adjacent teeth thereof, each of said recesses including a pair of facing surfaces of shape corresponding to the pair of working surfaces of said projecting tooth;

only the teeth of said link members of respective modules being in driving engagement with the recesses of said sprocket wheel, the engaged link belt and sprocket wheel exhibiting minimal scrubbing action and chordal action; and said teeth of said sprocket wheel engaging said link modules and being radially aligned with respective pivot axes during sprocket wheel and link module engagement.

13. The assembly of claim 12 wherein said tooth is blunted adjacent said line of intersection by a surface formed by a cylindrical segment having its axis on said line.

14. The assembly of claim 12 wherein said tooth is truncated adjacent said line of intersection.

15. The assembly of claim 12 wherein said link ends and tooth are of the same width.

16. The assembly of claim 12 wherein the projecting teeth of adjacent link members are joined with material of cross-section identical to the tooth member to form a solid tooth member extending the width of the link module.

17. A belt and sprocket assembly comprising a plurality of identical linked modules of unitary construction interconnected in end-to-end relation to form a belt, each module including:

a plurality of link members of identical shape;

each member having a flattened elliptical portion with first and second ends and a tooth portion projecting outward from said elliptical portion;

said ends each having first and second pivot holes therethrough and defining first and second pivot axes axially through said pivot holes;

a plurality of intermediate rigid members integral with said link members for spacing said plurality of link members equally one from the other to coaxially align first and second pivot axes of respective link members and permit interpositioning of the first link member ends of one link module within spaces between second link member ends of an adjacent link module;

said first and second pivot axes defining a pitch plane and said tooth of each link member being symmetrically disposed about a plane orthogonal to the pitch plane and parallel to and bisecting the pitch axes;

means extending through respective first and second pivot holes of adjacent modules to secure adjacent modules one to the other and to provide for pivotable rotation of adjacent link modules;

said projecting tooth of each module having first and second working surfaces, each symmetrically disposed on a respective side of said orthogonal plane, said surfaces intersecting at a line parallel to the pivot axes in said orthogonal plane;

each working surface having a shape in the form of a cylindrical segment, the segment having a center located at the farthest pivot axis or between that axis and the orthogonal plane;

a toothed sprocket wheel having recesses between adjacent teeth thereof, each of said recesses including a pair of facing surfaces of shape corresponding to the pair of working surfaces of said projecting tooth;

only the teeth of said link members of respective modules being in driving engagement with the recesses of said sprocket wheel, the engaged link belt and sprocket wheel exhibiting minimal scrubbing action and chordal action upon engagement of said belt with said wheel; and said teeth of said sprocket wheel engaging said link modules and being radially aligned with respective pivot axes of said link modules upon sprocket wheel and link module engagement.

18. The assembly of claim 17 wherein said tooth is blunted adjacent said line of intersection by a surface formed by a cylindrical segment having its axis on said line.

19. The assembly of claim 17 wherein said tooth is truncated adjacent said line of intersection.

20. The assembly of claim 17 wherein said link ends and tooth are of the same width.

21. The assembly of claim 17 wherein the projecting teeth of adjacent link members are joined with material of cross-section identical to the tooth member to form a solid tooth member extending the width of the link module.

22. The assembly of claim 17 wherein said working surfaces are curved and said facing surfaces are curved and inverse to the curved working surfaces to confront said working surfaces upon link module and sprocket wheel engagement.

23. A belt and sprocket assembly comprising:

a plurality of identical linked modules of unitary construction interconnected in an end-to-end relation to form a belt, each module including:

a plurality of link members of identical shape;

each member having a flattened elliptical portion with first and second ends and a tooth portion projecting outward from said elliptical portion;

said ends each having first and second pivot holes therethrough and defining first and second pivot axes axially through said pivot holes;

a plurality of intermediate rigid members integral with said link members for spacing said plurality of link members equally one from the other to coaxially align first and second pivot axes of respective link members and provide interpositioning of the first link member ends of one link module within spaces between second link member end of an adjacent link module;

said first and second pivot axes defining a pitch plane and said tooth of each link member being symmetrically disposed about a plane orthogonal to the pitch plane and parallel to and bisecting the pitch axes;

means extending through said pivot holes of said link member ends to secure adjacent modules one to the other and to provide for pivotable rotation of adjacent link modules;

said projecting tooth of each module having first and second working surfaces each symmetrically disposed on a respective side of said orthogonal plane, said surfaces intersecting at a line parallel to the pivot axes in said orthogonal plane;

each working surface having a shape in the range between a cylindrical segment and a chord of a cylindrical segment having a center located at the farthest pivot axis or between that axis and the orthogonal plane;

said module including a single tapered side which tapers toward the projecting tooth such that in cross-section the module is narrower near the tooth, the taper having an angular configuration to mate with a corresponding V-shaped sprocket wheel;

said module pivotably connected at respective first and second link ends, the tapered side of each module being opposite the tapered side of adjacent modules to provide an average cross-section of said belt having a V-shaped configuration to mate with a corresponding V-shaped wheel;

a V-shaped tooth sprocket wheel having recesses between adjacent teeth thereof, each of said recesses including a pair of facing surfaces of shape corresponding to the pair of working surfaces of said projecting tooth;

only the teeth of said link members of respective modules being in driving engagement with the recesses of said sprocket wheel, the engaged link belt and sprocket wheel exhibiting minimal scrubbing action and chordal action; and said teeth of said sprocket wheel engaging said link modules and being radially aligned with respective pivot axes during sprocket wheel and link module engagement.

24. The assembly of claim 23 wherein said tooth is blunted adjacent said line of intersection by a surface formed by a cylindrical segment having its axis on said line.

25. The assembly of claim 23 wherein said tooth is truncated adjacent said line of intersection.

26. The assembly of claim 23 wherein said link ends and tooth are of the same width.

27. The assembly of claim 23 wherein the projecting teeth of adjacent link members are joined with material of cross-section identical to the tooth member to form a solid tooth member extending the width of the link module.

28. A linked belt and sprocket assembly comprising:
a plurality of identical linked modules interconnected in end-to-end relation to form a belt, each module having one or more links of the same length and width and sufficiently rigid to resist bending in the plane of an associated sprocket wheel, each link having first and second ends, each link end having a pivotal hole defining first and second pivotal axes;

said link ends having no driving engagement with an associated sprocket wheel;

each of said modules having at least one driving tooth integral with and protruding therefrom substantially normal to the pitch line between said pivotal axes and intermediate the latter;

said tooth having a pair of working surfaces, each of the working surfaces having a shape in the range between and including that of a cylindrical segment and a chord of said segment;

the axis of each working surface being parallel with the pivotal axes of the link and positioned intermediate the pivotal axes or coincident with the pivotal axis furthest from that surface;

the pair of working surfaces being part of a pair of intersecting loci;

the shape of each of the working surfaces being such that the tangent angle of each such surface is not more than 90°;

one of said pluralities of link ends of each said module being engaged between one of said pluralities of link ends of an adjacent module except for the individual link ends positioned at the extreme sides of said belt;

means extending through said holes pivotally connecting said modules at engaged link ends;

a toothed sprocket wheel having recesses between adjacent teeth thereof, each of said recesses including a pair of facing surfaces of shape corresponding to the pair of working surfaces of said driving tooth; and only the teeth of said connected links being in driving engagement with the recesses of said sprocket wheel, the engaged linked belt and sprocket wheel exhibiting minimal scrubbing action and chordal action.

29. A linked belt assembly as defined in claim 1 wherein said modules are each of integral construction.

30. A linked belt assembly as defined in claim 29 wherein said modules each include:
intermediate members integral with and joining the links to preserve the parallel relation of said link ends and said axes.

31. A linked belt assembly as defined in claim 1 wherein the links of said module are of solid material along the axis of driving force.

* * * * *